(12) United States Patent
Hoshiba

(10) Patent No.: US 10,934,201 B2
(45) Date of Patent: Mar. 2, 2021

(54) SLEEVE FOR GLASS TUBE MOLDING

(71) Applicant: NIPPON ELECTRIC GLASS CO., LTD., Otsu (JP)

(72) Inventor: Kenichi Hoshiba, Otsu Shiga (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 212 days.

(21) Appl. No.: 16/060,646

(22) PCT Filed: Oct. 14, 2016

(86) PCT No.: PCT/JP2016/080593
§ 371 (c)(1),
(2) Date: Jun. 8, 2018

(87) PCT Pub. No.: WO2017/098807
PCT Pub. Date: Jun. 15, 2017

(65) Prior Publication Data
US 2018/0362382 A1 Dec. 20, 2018

(30) Foreign Application Priority Data
Dec. 10, 2015 (JP) .............................. JP2015-241630

(51) Int. Cl.
*C03B 17/04* (2006.01)
*C23C 4/06* (2016.01)
(Continued)

(52) U.S. Cl.
CPC ............ *C03B 7/088* (2013.01); *C03B 17/025* (2013.01); *C03B 17/04* (2013.01); *C04B 35/10* (2013.01);
(Continued)

(58) Field of Classification Search
CPC ................................ C03B 17/04; C03B 7/008
See application file for complete search history.

(56) References Cited

U.S. PATENT DOCUMENTS

| 2,420,934 | A | * | 5/1947 | Danner | .................. | C03B 17/04 |
| | | | | | | 65/187 |
| 3,364,004 | A | * | 1/1968 | Cozine | .................. | C03B 17/04 |
| | | | | | | 65/187 |

(Continued)

FOREIGN PATENT DOCUMENTS

| JP | S4029817 Y1 | 10/1965 |
| JP | H05301728 A | 11/1993 |

(Continued)

OTHER PUBLICATIONS

JP H05-301728 A (Kasai) Nov. 16, 1993 (English language machine translation). [online] [retrieved May 3, 2020]. Retrieved from: Espacenet. (Year: 1993).*

(Continued)

*Primary Examiner* — Erin Snelting
(74) *Attorney, Agent, or Firm* — Cantor Colburn LLP

(57) ABSTRACT

Provided is a sleeve for glass tube molding that, without reducing the mechanical strength of the sleeve shaft, can prevent foreign objects such as rust from generating off the sleeve shaft and can prevent foreign objects such as rust from adhering to molten glass. The sleeve for glass tube molding is equipped with a sleeve shaft having a through-hole, and is equipped with a pipe member comprising a material having superior rust resistance to the sleeve shaft. The pipe member is provided with a main body portion, and a tapered portion. The through-hole is provided with an insertion portion into which the main body portion is inserted, and a contact portion with a tapered shape whereat the outer peripheral surface of the tapered portion comes into contact with one end of the through-hole. A portion or all of the inner surface of the through-hole is covered by inserting the pipe member into the through-hole.

1 Claim, 2 Drawing Sheets

(51) Int. Cl.
*C03B 7/088* (2006.01)
*C23C 4/134* (2016.01)
*C03B 17/02* (2006.01)
*C04B 35/10* (2006.01)
*C04B 35/14* (2006.01)
*C04B 35/48* (2006.01)
*C23C 28/00* (2006.01)

(52) U.S. Cl.
CPC ............. *C04B 35/14* (2013.01); *C04B 35/48* (2013.01); *C23C 4/134* (2016.01); *C23C 28/321* (2013.01); *C23C 28/3455* (2013.01)

(56) References Cited

U.S. PATENT DOCUMENTS 8,336,336 B2 * 12/2012 Singer .................... C03B 5/1672
65/352

2016/0046517 A1 * 2/2016 Kass ....................... C03C 17/06
65/87
2018/0362384 A1 * 12/2018 Hoshiba ................. C03B 17/04

FOREIGN PATENT DOCUMENTS

| JP | H09328324 A | 12/1997 |
| JP | H11322350 A | 11/1999 |
| JP | 2008266082 A | 11/2008 |

OTHER PUBLICATIONS

International Preliminary Report on Patentability corresponding to Application No. PCT/JP2016/080593; dated Jun. 12, 2018.
Written Opinion of the International Searching Authority corresponding to Application No. PCT/JP2016/080593; dated Jan. 10, 2017.
International Search Report corresponding to Application No. PCT/JP2016/080593; dated Jan. 10, 2017.

* cited by examiner

SLEEVE FOR GLASS TUBE MOLDING

CROSS REFERENCE TO RELATED APPLICATIONS

This is the U.S. national stage of application No. PCT/JP2016/080593, filed on Oct. 14, 2016. Priority under 35 U.S.C. § 119(a) and 35 U.S.C. § 365(b) is claimed from Japanese Application No. 2015-241630, filed on Dec. 10, 2015, the disclosures all of which are also incorporated herein by reference.

TECHNICAL FIELD

The present invention relates to a technique of a sleeve for glass tube molding used in the Danner process.

BACKGROUND ART

Conventionally, the Danner process has been widely used as a method for mass-producing a glass tube and a glass rod.

In the Danner process, molten glass flows down on a sleeve, which is supported with a tip inclined downward and rotated about an axial center, and the flowed-down molten glass is wound around an outer circumferential surface of the sleeve, the molten glass is drawn while blow air is jetted (or not jetted) from the tip of the sleeve glass, thereby continuously molding the glass tube or the glass rod.

The sleeve used in the Danner process is mainly constructed with a sleeve shaft that is supported with the tip inclined downward and a tip support (metal tip), a refractory cylindrical body, a rear support, and the like, which are coaxially provided in order on the sleeve shaft (for example, see Patent Document 1). The sleeve shaft is typically made of a steel material such as heat-resistant steel having high mechanical strength, and includes a through-hole (inner hole in Patent Document 1) in the center of the sleeve shaft in order to guide the blow air to the tip of the sleeve.

PRIOR ART DOCUMENT

Patent Document

Patent Document 1: JP-A 11-322350

SUMMARY OF THE INVENTION

Problems to be Solved by the Invention

As described above, when the glass tube is continuously molded by the Danner process, sometimes a foreign matter called a black dot is mixed in the glass tube.

The foreign matter is caused by rust generated from the steel material constituting the sleeve shaft.

More particularly, when the molten glass is wound around the sleeve to mold the glass tube or the glass rod, the steel material constituting the sleeve shaft is exposed to a high-temperature state, and the through-hole of the sleeve shaft is oxidized by the blow air. As a result, the rust is generated at the tip of the sleeve shaft and in an inner surface of the through-hole, peeled from the through-hole of the sleeve shaft by the blow air, is carried to the tip of the sleeve shaft, and adheres to the molten glass drawn out from the tip of the sleeve.

For this reason, there is a demand for a configuration that suppresses the rust generated from the sleeve shaft from adhering to the molten glass.

In order to suppress the generation of the rust, it is conceivable to form the sleeve shaft using a superior rust-resistant steel material. However, the mechanical strength is decreased when the rust resistance of the steel material is improved, which the sleeve shaft may be damaged or deformed when the glass tube or the glass rod is molded.

The present invention has been made to solve the problem described above and an object of the present invention is to provide a sleeve for glass tube molding capable of suppressing the generation of the foreign matter from the sleeve shaft and suppressing the foreign matter such as the rust from adhering to the molten glass without degrading mechanical strength of the sleeve shaft.

Solutions to the Problems

The problem to be solved by the present invention is as described above, and means for solving the problem will be described below.

According to one aspect of the present invention, a sleeve for glass tube molding includes a sleeve shaft including a through-hole, a refractory cylindrical body provided coaxially with the sleeve shaft around the sleeve shaft, and a pipe member having a hollow shape and made of a superior rust-resistant material having rust resistance superior to that of the sleeve shaft. The pipe member includes a main body having a cylindrical shape and a tapered unit that is provided at one end of the main body and includes an outer circumferential surface in which a diameter increases toward one end side of the pipe member, the through-hole of the sleeve shaft includes an insertion unit in which the main body of the pipe member is inserted and an abutment unit that communicates with the insertion unit at one end of the through-hole, has a tapered shape and abuts on the outer circumferential surface of the tapered unit, and a part or whole of an inner surface of the through-hole of the sleeve shaft is covered with by inserting the pipe member into the through-hole of the sleeve shaft.

In the sleeve for glass tube molding of the present invention, the pipe member made of the superior rust-resistant material having rust resistance superior to that of the sleeve shaft is inserted into the through-hole of the sleeve shaft to cover the part or whole of the inner surface of the through-hole of the sleeve shaft. Consequently, the blow air does not come into direct contact with the part or whole of the inner surface of the through-hole of the sleeve shaft, and the foreign matter such as the rust can be suppressed from being generated from the sleeve shaft, and suppressed from adhering to the molten glass.

In the sleeve for glass tube forming having the configuration, even if the sleeve shaft is not formed using a steel material having superior rust resistance but poor mechanical strength, the foreign matter such as the rust is suppressed from being generated from the sleeve shaft, so that the mechanical strength of the sleeve shaft can be maintained.

In the sleeve for glass tube molding of the present invention, preferably at a tip of the sleeve shaft, a portion exposed to an outside includes a coating unit formed by thermal spraying of a superior rust-resistant metal material having rust resistance superior to that of a metal material forming the sleeve shaft.

In the sleeve for glass tube molding having the above configuration, the generation of the rust can be suppressed at the tip of the sleeve shaft.

Thus, the foreign matter, such as the rust, which is generated from the sleeve shaft, can be suppressed from adhering to the molten glass.

As used herein, the "superior rust-resistant" means a metal material in which the rust is not generated on a surface of the material when the material is exposed to air at 1000° C. for 150 hours.

Effects of the Invention

The effect of the present invention is obtained as follows.

That is, in the sleeve for glass tube molding of the present invention, the foreign matter such as the rust, which is generated from the sleeve shaft, can be suppressed from adhering to the molten glass without degrading the mechanical strength of the sleeve shaft.

EMBODIMENT OF THE INVENTION

An embodiment of the present invention will be described below with reference to FIG. 1 and FIG. 2.

Figure 1:
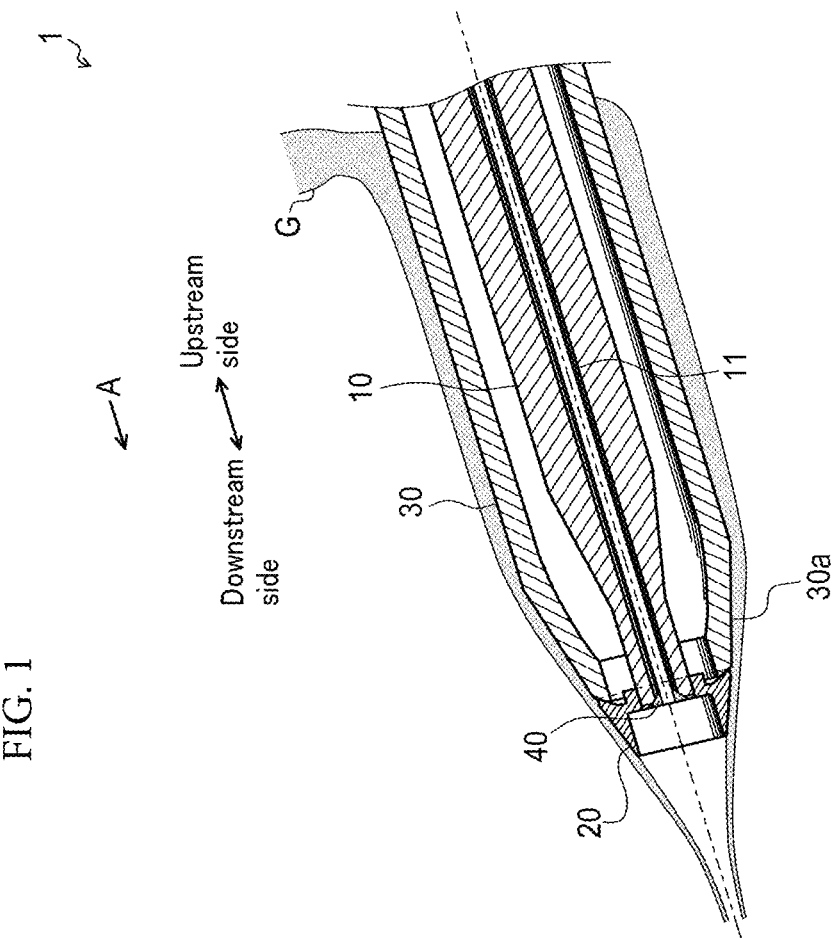
FIG. 1 is a sectional side view illustrating a configuration of a sleeve for glass tube molding according to an embodiment of the present invention.
Figure 2:
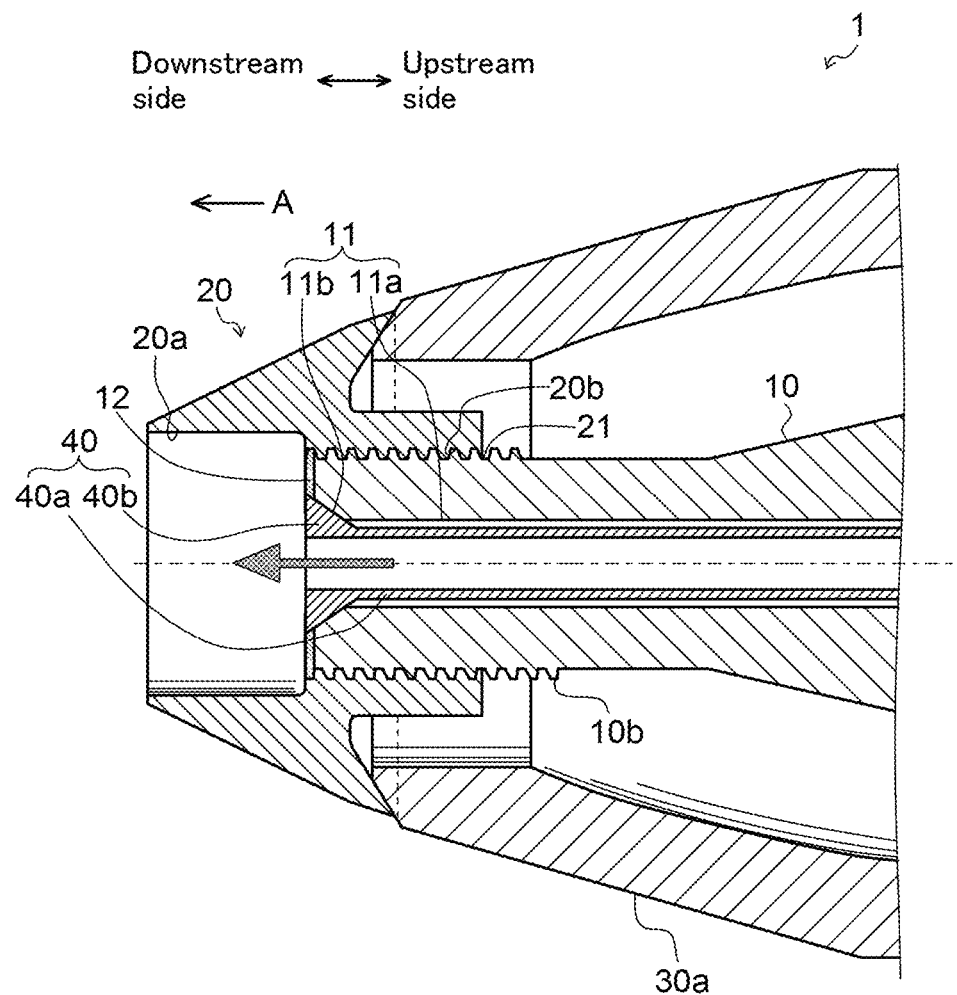
FIG. 2 is an enlarged sectional side view illustrating a vicinity of a tip of the sleeve for glass tube molding.

In the following description, for convenience, a direction of an arrow A in FIG. 1 and FIG. 2 is defined as a drawing direction (conveying direction) of molten glass G.

In the following description, for convenience, a vertical direction in FIG. 1 and FIG. 2 is defined as a vertical direction of a sleeve 1 for glass tube molding.

[Sleeve 1 for Glass Tube Molding] An entire configuration of a sleeve 1 for glass tube molding (hereinafter, simply referred to as a "sleeve 1") embodying the present invention will be described with reference to FIG. 1 and FIG. 2.

For example, the sleeve 1 according to the embodiment is used to mass-produce a glass tube or a glass rod by the Danner process.

The sleeve 1 is mainly constructed with a sleeve shaft 10, a metal tip 20, a refractory cylindrical body 30, a pipe member 40, and a holding metal fitting (not illustrated).

The sleeve shaft 10 is a base of the sleeve 1.

The sleeve shaft 10 is constructed with an elongated hollow round rod member made of heat-resistant steel, such as an Fe—Co—Ni type alloy and an Fe—Cr—Ni type alloy, which has high mechanical strength, and a through-hole 11 that has a circular section and constitutes an inner circumference of the sleeve shaft 10 is coaxially drilled in the sleeve shaft 10.

That is, the sleeve shaft 10 includes the through-hole 11 in the center thereof.

As illustrated in FIG. 2, the through-hole 11 includes an insertion unit 11a in which a main body 40a of the pipe member 40 is inserted and an abutment unit 11b, which has a tapered shape and communicates with the insertion unit 11a at one end of the through-hole 11 and abuts on an outer circumferential surface of a tapered unit 40b of the pipe member 40.

The insertion unit 11a is a long through-hole having a circular section.

The abutment unit 11b is an inner surface of the sleeve shaft 10 in which a diameter increases gradually toward one end in a longitudinal direction of the sleeve shaft 10.

A coating unit 12 which has an annular shape and is exposed to an outside in a recess 20a of the metal tip 20 is provided at the tip of the sleeve shaft 10.

The coating unit 12 is an annular metal film formed by thermal spraying of a predetermined metal material.

That is, the tip of the sleeve shaft 10 is covered with the coating unit 12, and a base of the sleeve shaft 10 is not exposed.

In the embodiment, the coating unit 12 is formed by thermal spraying of heat-resistant steel having superior rust resistance (rust-resistant) to that of the steel material forming the sleeve shaft 10.

A thickness of the coating unit 12 is substantially even.

In the embodiment, the material for the coating unit 12 is a steel material. Alternatively, other metal materials may be used as a material for the coating unit 12.

A known method such as flame spraying, plasma spraying can be adopted as a thermal spraying method.

The coating unit 12 may be formed by a method except for the thermal spraying, for example, evaporation.

In FIG. 1 and FIG. 2, for the purpose of easy understanding, the coating unit 12 is illustrated thicker than it actually is.

For example, the thickness of the coating unit 12 ranges from 50 μm to 1000 μm, preferably 100 μm to 500 μm. In the embodiment, the thickness is 250 μm.

When the thickness of the coating unit 12 is less than 50 μm, possibly peeling or cracks of the coating unit 12 or erosion of the coating unit 12 by the molten glass G is generated during the glass tube molding.

On the other hand, when the thickness of the coating unit 12 exceeds 1000 μm, possibly cracks or peeling may be generated on the side of the coating unit 12 during the thermal spraying.

The sleeve shaft 10 is disposed in an attitude in which one end (the end on the drawing direction side (the direction side indicated by the arrow A in FIG. 1) of the molten glass G) is inclined downwardly, and detachably supported by a rotation driving device (not illustrated) at the other end.

The metal tip 20 will be described below.

The metal tip 20 is an example of a metal tip constituting the tip of the sleeve 1, and holds the refractory cylindrical body 30 while the refractory cylindrical body 30 is sandwiched between the metal tip 20 and the holding metal fitting (to be described later).

The metal tip 20 is formed into a truncated conical shape and made of heat-resistant steel such as an Fe—Co—Ni type alloy or a Fe—Cr—Ni type alloy. At the tip of the sleeve shaft 10, the metal tip 20 is provided so as to be coaxially with the sleeve shaft 10, and such that a sectional area of the metal tip 20 decreases gradually toward a drawing side of the molten glass G (hereinafter, referred to as a "downstream side").

A recess 20a having a circular sectional shape is coaxially formed at an end on the downstream side of the metal tip 20.

A through-hole 21 having a circular sectional shape is coaxially drilled in an end surface on an opposite side (hereinafter, referred to as an "upstream side") to the downstream side of the recess 20a.

A female screw 20b is coaxially threaded in the through-hole 21.

A male screw 10b is threaded on the tip of the sleeve shaft 10.

The metal tip 20 is coaxially screwed to the tip of the sleeve shaft 10 while the male screw 10b and the female screw 20b are interposed therebetween.

Consequently, the metal tip 20 is fixed to the tip of the sleeve shaft 10.

The refractory cylindrical body 30 will be described below.

The refractory cylindrical body 30 gradually conveys the molten glass G guided to the sleeve 1 onto the downstream side while winding the molten glass G on an outer circumferential surface of the refractory cylindrical body 30.

The refractory cylindrical body 30 is constructed with an elongated round rod hollow member made of a refractory material such as a silica-alumina base refractory material and a silica-alumina-zirconia base refractory material, and a tapered portion 30a in which a sectional area decreases gradually is formed at one end of the refractory cylindrical body 30.

A platinum film or a platinum-alloy film having a film thickness of, for example, 250 to 450 μm is coated on the outer circumferential surface of the refractory cylindrical body 30.

On the upstream side of the metal tip 20, the refractory cylindrical body 30 is provided coaxially with the sleeve shaft 10 around the sleeve shaft 10 while the tapered portion 30a is directed toward the downstream side.

As a result, the metal tip 20 is disposed on one end side (downstream side) of the refractory cylindrical body 30, and the tapered portion 30a of the refractory cylindrical body 30 and the tapered shape of the outer circumferential surface of the metal tip 20 are smoothly connected at the end on the downstream side of the whole sleeve 1.

The metal tip 20 regulates movement of the refractory cylindrical body 30 to the downstream side (the tip side of the sleeve shaft 10) in an axial center direction.

[Pipe member 40] A configuration of the pipe member 40 will be described below with reference to FIG. 1 and FIG. 2.

The pipe member 40 is an elongated hollow member made of heat-resistant steel, such as an Fe—Cr—Ni type alloy, which has superior rust resistance (is resistant to rust), and the pipe member 40 includes the main body 40a having a cylindrical shape and the tapered unit 40b provided at one end (tip) of the outer circumferential surface of the main body 40a as illustrated in FIG. 2.

The main body 40a is a cylindrical portion in which an outer diameter of the main body 40a is slightly smaller than a diameter of the insertion unit 11a of the sleeve shaft 10.

The main body 40a is used to allow blow air to flow through the tip of the sleeve shaft 10.

The main body 40a is inserted in the through-hole 11 of the sleeve shaft 10, thereby covering a part or whole of the inner surface of the insertion unit 11a of the through-hole 11. In the case that the part or whole of the inner surface of the insertion unit 11a of the through-hole 11 is covered with the main body 40a, it is preferable to cover the whole of the inner surface of the through-hole 10a rather than only the part of the inner surface. This is because generation of a foreign matter such as rust from the sleeve shaft can be suppressed more effectively.

The main body 40a is disposed such that the other end of the main body 40a protrudes from an insertion hole (not illustrated) of the holding metal fitting disposed on the upstream side of the refractory cylindrical body 30.

The tapered unit 40b is a truncated conical portion, which is provided at one end of the main body 40a and includes an outer circumferential surface having a tapered shape in which a diameter increases toward the one end side of the pipe member 40.

That is, the upstream end of the tapered unit 40b is formed continuous to the downstream end (tip) of the main body 40a.

The diameter of the tapered unit 40b increases gradually toward the downstream side, and the tapered unit 40b is formed such that an outer diameter of the tapered unit 40b is maximized at the downstream end (tip).

The tapered unit 40b is a portion in which the outer circumferential surface of the tapered unit 40b abuts on the abutment unit 11b of the sleeve shaft 10 when the pipe member 40 is inserted into the through-hole 11 of the sleeve shaft 10 and attached to the sleeve shaft 10.

The tapered unit 40b abuts on the abutting unit 11b and the coating unit 12 of the sleeve shaft 10, and becomes substantially flush with the surface of the coating unit 12 while one end face (tip surface) of the tapered unit 40b is exposed to the outside.

In the pipe member 40, the main body 40a is inserted into the through-hole 11 of the sleeve shaft 10, the other end of the pipe member 40 is inserted in the insertion hole of the holding metal fitting, the other end protrudes from the holding metal fitting, and the tapered unit 40b that is one end is disposed while abutting on the abutment unit 11b of the sleeve shaft 10. Thus, the pipe member 40 covers the whole inner surface of the through-hole 11 (the insertion unit 11a, the abutment unit 11b) of the sleeve shaft 10.

The pipe member 40 is disposed substantially coaxially with the sleeve shaft 10.

The pipe member 40 communicates with a blow air supply device (not illustrated) through a piping member or the like at the upstream end.

Thus, blow air can be supplied to the tip of the sleeve shaft 10 through the pipe member 40 by driving the blow air supply device.

The pipe member 40 includes a biasing unit (not illustrated) at the other end of the pipe member 40.

At this point, the biasing unit biases the pipe member 40 toward the upstream side in the axial center direction.

The biasing unit includes a biasing member in which one end is connected to a base end of the sleeve shaft 10 while the other end is connected to the other end of the pipe member 40.

The biasing member is a member that biases the pipe member 40 toward the upstream side.

For example, the biasing member is constructed with a known compression coil spring.

Thus, the pipe member 40 is always pulled toward the base end side of the sleeve shaft 10 by the biasing unit.

Although the pipe member 40 of the embodiment includes the biasing unit, the pipe member 40 is not limited thereto. The pipe member 40 may not include the biasing unit.

The holding metal fitting will be described below.

The holding metal fitting holds the refractory cylindrical body 30 while the refractory cylindrical body 30 is sandwiched between the holding metal fitting and the metal tip 20.

The holding metal fitting is made of heat-resistant steel such as an Fe—Co—Ni type alloy and a Fe—Cr—Ni type alloy, and an insertion hole is made in the holding metal fitting in order to insert the other end of the sleeve shaft 10 to protrude to the outside.

On the other end side (upstream side) of the refractory cylindrical body 30, the holding metal fitting is provided coaxially and slidably into the sleeve shaft 10, and abuts on the end of the refractory cylindrical body 30.

As described above, the sleeve 1 of the embodiment is constructed with the sleeve shaft 10 including the coating unit 12 at the tip, the pipe member 40, the metal tip 20, the refractory cylindrical body 30, the holding metal fitting, and the like. The metal tip 20, the refractory cylindrical body 30, the holding metal fitting, and the like are coaxially provided from the downstream side toward the upstream side in order on the sleeve shaft 10.

In the pipe member 40, the tapered unit 40b abuts on the abutment unit 11b while the main body 40a is inserted into the insertion unit 11a of the through-hole 11 of the sleeve shaft 10, and the other end of the main body 40a protrudes from the insertion hole of the holding metal fitting. The pipe member 40 is provided so as to be slidable in the axial center direction with respect to the sleeve shaft 10, and the pipe member 40 is always biased toward the upstream side by the biasing unit provided at the other end of the pipe member 40.

Consequently, the outer circumferential surface of the tapered unit 40b of the pipe member 40 is in close contact with the abutment unit 11b of the sleeve shaft 10 while the pipe member 40 is always inserted into the through-hole 11 of the sleeve shaft 10 by biasing force of the biasing unit.

A predetermined pressure is always applied to the tapered unit 40b of the pipe member 40 to push the abutment unit 11b to the upstream side by the biasing force of the biasing unit. However, the mechanical strength withstanding the pressure can be secured because the tapered unit 40b is formed into the truncated conical shape.

As a result, generation of a gap between the abutment unit 11b of the sleeve shaft 10 and the tapered unit 40b can be suppressed.

The sleeve 1 having the above configuration is rotated about the axial center, and the molten glass G flows down on the sleeve 1 rotated (more specifically, the refractory cylindrical body 30), the flowed-down molten glass G is wound around the outer circumferential surface of the sleeve 1, and the molten glass G is drawn while the blow air is jetted out from the tip of the sleeve 1 (more specifically, the recess 20a of the metal tip 20), thereby continuously molding the glass tube or the glass rod.

As described above, in the sleeve 1 of the embodiment, by inserting the pipe member 40 into the through-hole 11 of the sleeve shaft 10, the tapered unit 40b of the pipe member 40 abuts on the abutment unit 11b of the sleeve shaft 10 to cover the part or whole of the inner surface of the through-hole 11.

Even if the rust is generated in the inner surface of the insertion unit 11a of the sleeve shaft 10, the inner surface of the insertion unit 11a is covered with the main body 40a of the pipe member 40 to prevent the diffusion of the rust, and the tapered unit 40b of the pipe member 40 abuts on the abutment unit 11b of the sleeve shaft 10 to eliminate the gap between the sleeve shaft 10 and the pipe member 40 on the downstream side (tip side) of the sleeve shaft 10. Consequently, the foreign matter such as the rust can be confined between the insertion unit 11a of the sleeve shaft 10 and the main body 40a of the pipe member 40, and the rust generated on the upstream side of the sleeve shaft 10 does not leak out to the outside.

Thus, the generation of the foreign matter such as rust from the sleeve shaft 10 can be prevented, and adhesion of the foreign matter such as rust to the molten glass G can be suppressed.

In the sleeve 1 of the embodiment, the exposed portion of the sleeve shaft 10 at its tip portion has the coating unit 12 that is formed by the thermal spraying of the steel material having the superior rust resistance to that of the steel material forming the pipe member 40.

Consequently, the generation of the rust can be suppressed at the tip of the sleeve shaft 10.

Thus, the foreign matter, such as the rust, which is generated from the sleeve shaft 10, can be suppressed from adhering to the molten glass G.

INDUSTRIAL APPLICABILITY

The sleeve for glass tube molding of the present invention can be used as a technique of a sleeve that guides the molten glass to the downstream side while winding the molten glass around the outer circumferential surface in the Danner process adopted for the mass production of the glass tube or glass rod, for example.

DESCRIPTION OF REFERENCE SIGNS

1: Sleeve for glass tube molding
10: Sleeve shaft
11: Through-hole
11a: Insertion unit
11b: Abutment unit
12: Coating unit
30: Refractory cylindrical body
40: Pipe member
40a: Main body
40b: Tapered unit

The invention claimed is:

1. A sleeve for glass tube molding comprising:
a sleeve shaft including a through-hole;
a refractory cylindrical body provided coaxially with the sleeve shaft around the sleeve shaft; and
a pipe member having a hollow shape and made of a superior rust-resistant material having rust resistance superior to that of the sleeve shaft,
wherein
the pipe member includes a main body having a cylindrical shape and a tapered unit that is provided at one end of the main body and includes an outer circumferential surface in which a diameter gradually increases toward one end side of the pipe member,
the through-hole of the sleeve shaft includes an insertion unit in which the main body of the pipe member is inserted and an abutment unit that communicates with the insertion unit at one end of the through-hole, has a tapered shape and abuts on the outer circumferential surface of the tapered unit, and a part or whole of an inner surface of the through-hole of the sleeve shaft is covered by inserting the pipe member into the through-hole of the sleeve shaft, and
at a tip of the sleeve shaft, a portion exposed to an outside includes a coating unit formed by thermal spraying of a superior rust-resistant metal material having rust resistance superior to that of a metal material forming the sleeve shaft.

* * * * *